US012763552B2

(12) United States Patent
Zhang

(10) Patent No.: US 12,763,552 B2
(45) Date of Patent: Oct. 13, 2026

(54) PARALLEL LOAD SERVICE FOR MULTI-FAMILY METERING DEVICES

(71) Applicant: Siemens Industry, Inc., Alpharetta, GA (US)

(72) Inventor: Fan Zhang, Suwanee, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 286 days.

(21) Appl. No.: 18/486,186

(22) Filed: Oct. 13, 2023

(65) Prior Publication Data

US 2025/0125591 A1 Apr. 17, 2025

(51) Int. Cl.

*H02B 1/04* (2006.01)
*B60L 53/10* (2019.01)
*B60L 53/66* (2019.01)
*H02B 1/03* (2006.01)
*H02G 5/00* (2006.01)

(52) U.S. Cl.

CPC .............. *H02B 1/041* (2013.01); *B60L 53/10* (2019.02); *B60L 53/665* (2019.02); *H02B 1/03* (2013.01); *H02G 5/005* (2013.01)

(58) Field of Classification Search

CPC ................ H02B 1/03; H02B 1/04–041; H02B 1/04–041; H02G 5/005; B60L 53/10; B60L 53/665

See application file for complete search history.

(56) References Cited

U.S. PATENT DOCUMENTS

| | | | | | | |
|---|---|---|---|---|---|---|
| 2,606,232 | A | * | 8/1952 | St John | G01R 11/04 | 439/189 |
| 2,738,446 | A | * | 3/1956 | Fleming | H02B 1/21 | 439/212 |
| 2,897,410 | A | * | 7/1959 | Hammerly | H02B 1/056 | 361/636 |
| 2,905,796 | A | * | 9/1959 | Fleming | H02B 1/21 | 337/186 |
| 3,263,132 | A | * | 7/1966 | Bangert, Jr. | H02B 1/056 | 361/635 |
| 3,530,340 | A | * | 9/1970 | Meacham | G01R 11/04 | 361/660 |
| 3,585,456 | A | * | 6/1971 | Phillips, Jr. | H02B 1/50 | 361/671 |
| 3,744,010 | A | * | 7/1973 | Meacham | H02B 1/03 | 439/301 |
| 4,153,318 | A | * | 5/1979 | Bishop | H02B 1/21 | 439/121 |
| 4,157,582 | A | * | 6/1979 | Myers | H02B 1/056 | 361/636 |
| 4,203,146 | A | * | 5/1980 | Sabatella | H02B 1/03 | 361/660 |
| 4,301,493 | A | * | 11/1981 | Schweikle | H02B 1/056 | 361/640 |

(Continued)

*Primary Examiner* — Robert J Hoffberg

(57) ABSTRACT

System, apparatus, and methodology for the provisioning of power to electrical loads and an EV charging station in a multi-dwelling building environment. Two electrically parallel configured circuit breakers, one to the tenant residence and one to an EV charging station, are connected to two load straps connected to a meter socket. The load straps are configured to supply simultaneous power to both the appliances of a tenant residence and an EV charging station.

5 Claims, 12 Drawing Sheets

(56) References Cited

U.S. PATENT DOCUMENTS

| | | | | |
|---|---|---|---|---|
| 6,295,201 | B1 * | 9/2001 | Ogden | H10W 90/00 174/16.3 |
| 6,421,229 | B1 * | 7/2002 | Campbell | H02B 1/03 361/659 |
| 6,545,374 | B1 * | 4/2003 | Allenbach | H01H 9/26 361/641 |
| 7,414,829 | B2 * | 8/2008 | Dixon | H01H 1/5866 361/636 |
| 7,796,375 | B2 | 9/2010 | Zhang | |
| 7,850,483 | B2 * | 12/2010 | Siglock | H01R 33/94 439/517 |
| 9,434,268 | B2 | 9/2016 | Deboer et al. | |
| 9,627,861 | B2 * | 4/2017 | Cruz | H02B 1/056 |
| 11,454,659 | B2 | 9/2022 | Davis et al. | |
| 2018/0015834 | A1 | 1/2018 | Karlson et al. | |

* cited by examiner

PARALLEL LOAD SERVICE FOR MULTI-FAMILY METERING DEVICES

FIELD

This disclosure relates to the use of load straps with separate circuit breakers connected to a metering device capable of monitoring power consumption by an electric vehicle charging station and multi-dwelling apartment loads.

BACKGROUND

Electric Vehicles (EV) are becoming more popular due to environmental concerns, advancement in battery technology, and the tax benefits given to EV purchasers by state and federal governments. However, one of the challenges for multi-family dwellers in owning an EV is finding a convenient and reliable place to charge the EV. The current use of EVs has been for the most part relegated to homeowners or individuals that have safe access to a charging space (i.e., garage, public charging stations etc.) and the electrical capacity to provide the necessary charge.

A solution for multi-family dwellers (i.e., apartment dwellers) is to have power supplied to communal charging stations from a common load center located near a designated parking area. The property manager or building association would be responsible for installing the necessary equipment to provide a manageable EV charging space at a designated parking area available to all tenants. Under this alternative, tenants that wish to have an EV charging station, would then be required to pay for any additional costs incurred due to electrical installation, charging equipment purchased and other incidental costs such as management and maintenance fees.

A communal charging station offers a more efficient alternative to charging EVs, although communal charging areas are not without its disadvantages. If power is supplied from a common electricity meter, the property manager or building association will be required recover the costs associated with each individual tenant. Separate accounts for each tenant would need to be created and a system for monitoring powering consumption and collection of payments would need to be established and implemented by an EV charging services provider. The charging services provider may charge a payment processing fee as well as a monthly service fee per tenant. Payments collected from tenants are then transferred back to the building association. The building association and charging services provider may establish a price for charging that covers the building association's additional electricity costs and charging services provider's management fees.

Alternatively, dedicated private charging spaces would enable tenants to charge their EVs in their own parking spaces, using an unshared charging station. In this case, the individual resident may be named as the customer of record (e.g., service account holder) and will be directly responsible for paying the utility bills related to that service account. Dedicated parking allows multi-family dwellers with EVs to access a dedicated, and an always available charging station to charge their electric vehicles.

Another option may be to use an EV charging cable extension cords that can be plugged into a 120V apartment outlet, and the cable extended to connect to the EV in a nearby parking spot. This Level 1 charging has generally been only able to provide 2 to 5 miles of range per hour of charging. This is perhaps the slowest and cheapest option for an apartment dweller. This option however renders the EV generally unavailable since a full charge may take a day or more.

Another alternative is for an apartment dweller to have access to a Level 2 240V outlet or a hard-wired connection in order to provide 10 to 60 miles of range per hour. This is the most common and convenient option for home and workplace charging, since the EV can be in most cases charged overnight or during the day. However, as an apartment dweller, very few leased apartments have access to either a community charging area that can provide Level 2 access or the means to have a dedicated 240V connection installed just for that particular apartment dweller. If available, this option would require the property management company to consent and invest in such community charging areas or to install specifically dedicated parking spots accessible by the apartment dweller at a premium cost.

Although Direct Current Fast Charging (DCFC) is an available technology, it is an unlikely alternative for apartment dwellers. DCFC uses high voltage direct current and can provide about 50 to 100 miles of range in about 15 to 30 minutes of charging. This is the fastest and most expensive option, however at this time not a feasible technology applicable to all standard EVs nor viably available to apartment dwellers.

Technically and logistically, one of the main issues with charging stations in a multi-family residence is that existing multi-family modular metering devices typically have only one circuit breaker for each tenant responsible for monitoring and shutting off power in the event that the circuit breaker senses an overload, arcing or ground fault condition associated with such a metering device. This circuit breaker, referred to as a tenant circuit breaker, is normally connected to a single unit of the multi-family residence directly and provides protection for typical home appliances. Tenant electrical infrastructure is normally built to accommodate 120V type of electrical outlet usage. Accordingly, asking for a Level 2 outlet or electrical connection, with such a standard electrical infrastructure poses additional expenses and may pose a significant safety risk.

And yet another alternative to provide power to an EV is to use a tap connector (also known as a splitter) to tap-off or divert power from a conductive pathway between the tenant circuit breaker and the load associated with a resident's apartment. Under this wiring configuration, the charging station would share the electrical current with the load at the resident's apartment. However, under these circumstances, the sharing of electrical current requires additional power load management devices to monitor power consumption and to allow certain appliances or an EV charging station to operate at certain coordinated times, and to safely provide powering while not overloading the tenant circuit breaker. The added cost to including power load management devices (smart power allocation devices) are very cost prohibitive.

Accordingly, there is a need for a system, apparatus and methodology which would safely provide the necessary powering to a charging station without compromising safety and operational efficiency in managing power consumption by both the apartment's electrical appliances and the EV charging station.

SUMMARY

The embodiments described below include a system, apparatus and methodology for the provisioning of power to electrical appliances and a charging station in a parallel means of power distribution.

In one embodiment, a system is provided that includes a metering device, a meter socket, a first load strap, a second load strap, a tenant circuit breaker, and an EV circuit breaker. The metering device is configured for measuring power consumption for both general appliances at a resident's apartment and an EV charging station. The metering device is connected to the meter socket that is in turn connected to the two load straps. One load strap is connected to phase A and a second load strap is connected to phase B. Each of the load straps (phase A and phase b) is connect to both the tenant circuit breaker and to the EV circuit breaker to provide overload, arcing, ground fault and other fault protection for appliances used in an apartment unit of a multi-family residence and the EV charging station located at a parking spot assigned to the corresponding apartment unit. The tenant circuit breaker and EV circuit breaker are electrically connected in parallel to the load straps. The load straps are configured to supply both phase A and phase B powering for both the tenant circuit breaker and the EV circuit breaker. It should be noted however, that although a two phase configuration (phase A and phase B) from a single phase power distribution system is generally referenced below, a three phase (phase A, phase B and phase C) may also be provided from a single phase power distribution system.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

DETAILED DESCRIPTION

Figure 1:
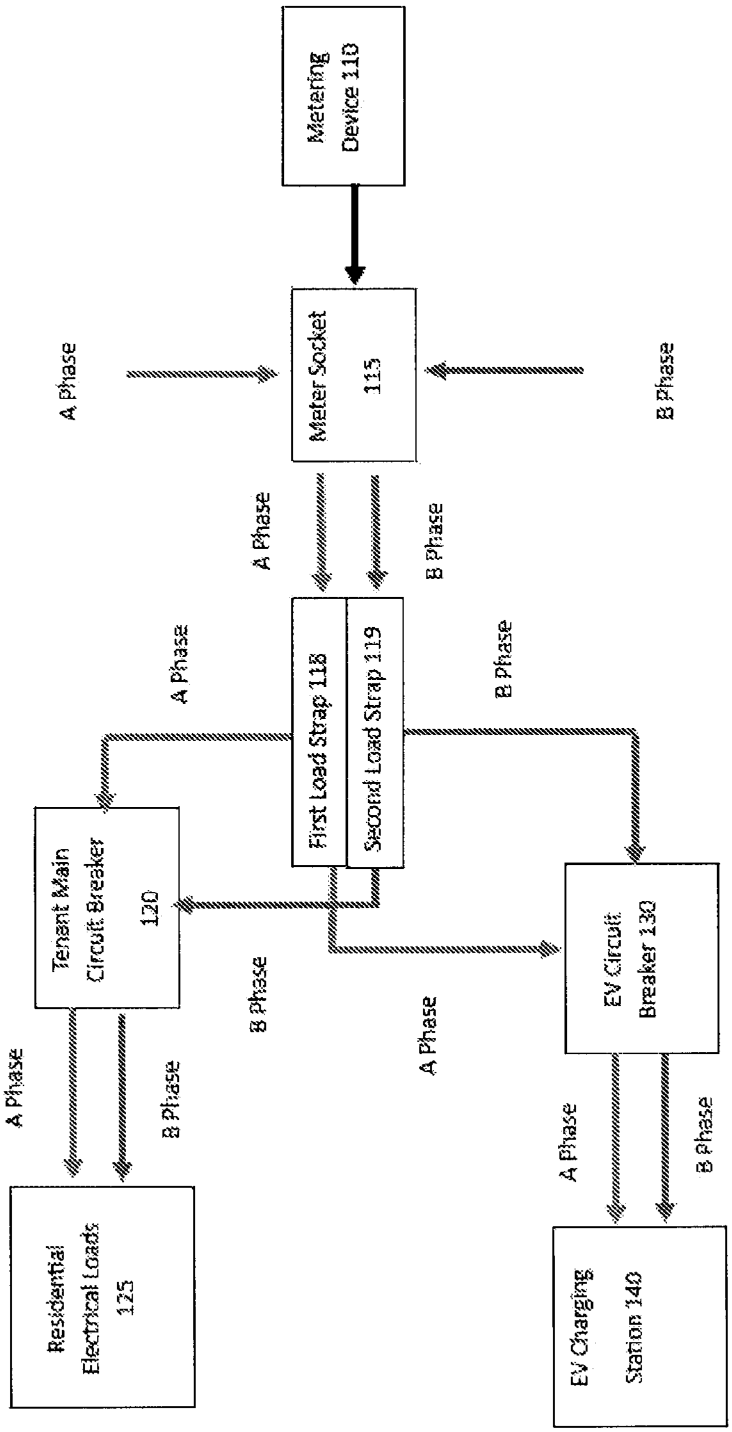
FIG. 1 depicts a system for using electrically parallel circuit breakers in multi-unit buildings for providing power to appliances at a resident's apartment and to an EV charging station according to an embodiment.

Embodiments described herein provide an apparatus, system and methodology for using two parallel circuit breakers (e.g., circuit breakers 120, 130 of FIG. 1) in multi-family residences for EV charging. Two circuit breakers, one to the tenant residence appliances and one to an EV charging station (e.g., EV charging station 140 of FIG. 1), are electrically connected in parallel to two load straps (e.g., first load strap 118 and second load strap 119 of FIG. 1). The load straps 118,119 are configured to supply power to both circuit breakers 120, 130, and to obviate the need for load management devices in order to prevent overload and other fault conditions in the future. The load straps 118, 119 are both connected to meter socket 115 that hosts modular meter device 110.

The embodiments herein provide different configurations of the load straps 118, 119 and provide for different circuit breaker orientations of the parallel circuit breakers 120, 130. For example, U-shaped stabs (e.g., stab 210, 211 of FIG. 2) allow for substantially vertical stacking of the two parallel circuit breakers 120, 130. Alternatively, an L-shaped stabs (e.g., bus 610, 611 of FIG. 6) allow for substantially horizontal installation of the two electrically parallel circuit breakers 120, 130. Wide stabs, (e.g., wide stabs 1036, 1038 of FIG. 10) on the wide stab load straps 1018,1019 may be used to provide substantially vertical stacking of the two electrically parallel circuit breakers, 120, 130 which share stabs 1040, 1042 (phase A and phase B).

FIG. 1 depicts a system for using parallel circuit breakers 120, 130 in multi-unit buildings for EV charging. A tenant circuit breaker 120 and an EV circuit breaker 130 are connected to load straps 118, 119 in an electrically parallel manner. The tenant circuit breaker 120 is connected to one or more residential appliances or devices at a multi-dwelling unit. Moreover, the EV circuit breaker 130 is connected to an EV charging station 140. To accommodate the powering needs of both the multi-dwelling unit appliances (load) and the EV charging station 140, two load straps 118, 119 having the necessary conductive characteristics to safely provide additional power by making use of a split-phase powering configuration. A first load strap 118 provides, for example, Phase A, while a second load strap 119 provides, for example, Phase B. For residential installation, this is normally installed as a split-phase 240V installation. Although a two phase system is described herein as having separate phases, in actuality the split-phase is from a single phase electric power distribution configuration that uses two separate wires with alternating current of the same voltage and frequency but out of phase by 180 degrees. The two wires have one wire at positive voltage while the second wire has a negative voltage in order to allow the use of both 20V and a 240V appliances and other devices in the same power distribution system. Other means of providing a 240V powering configuration may also be used.

In FIG. 1, a modular metering device 110 is configured to measure the power consumption used by the appliances or other loads located at the multi-dwelling unit, as well as the power consumed by the EV charging station 140. The metering device 110 may be an analog meter that uses mechanical components to measure energy consumption or a digital meter that incorporates the use of electronic components. Moreover, metering device 110 may in some cases have smart capabilities for transmitting energy consumption data back to the utility companies, or the capability to apply different pricing for certain time of day power usage. The metering device 110 may be connected to a main building circuit breaker or any other power distribution system that supplies power. As further shown in FIG. 1, metering device 110 is connected to meter socket 115. The meter socket 115 provides a connecting point for metering device 110 as well as serving as a connection point for both load straps 118, 119. The load straps 118, 119 (phase A and phase B) in turn each connect to the tenant circuit breaker 120 and the EV circuit breaker 130, via the U-shaped stabs 210, 211. Different configurations for the load straps 118, 119 are described below with reference to FIGS. 2-12. It should be understood that the composition, configuration and system construction and all the details disclosed herein may be used in all of the embodiments presented.

The tenant circuit breaker 120 is configured to connect to outlets at an apartment and is also configured to interrupt the current flow in the event that the current draw of the connected loads exceeds a safety threshold. The tenant circuit breaker 120 may be connected to residential electrical loads 125 (e.g., electrical devices, appliances, etc.) for a single unit of the multi-family apartment complex. In FIG. 1, 240V powering is available should the need arise, however, for the most part, 120V is generally the powering available to multi-dwelling units. Tenant circuit breaker 120 (also known as tenant main circuit breakers) may use a two-pole configuration with amperage ranging from 60 to 225 A. The tenant and EV circuit breakers 120, 130 may be a two pole or a double pole circuit breaker with or without enhanced smart features. Each of the double pole breakers is comprised of two single pole circuit breakers that operate as a single circuit breaker. Each of these single pole circuit breakers within circuit breakers 120,130 is provided with a female connector 123 (See FIG. 4) on the bottom/underside of the circuit breaker 120,130 that connects to a stab of a load strap 118, 119. A tie bar 121 may be used to connect the two handles of the two pole circuit breaker and to shut down current flow. Electronic, electro-mechanical, or solid-state circuit breakers may also be used alone or in combination, provided that the mating connectors are compatible. Electronic circuit breakers such as solid-state circuit breakers (SSCBs) are power semiconductor-based protection devices, with no moving parts for fault current interruption. Moreover, a composite circuit breaker having a combination of solid-state, electronic, and/or electro-mechanical components may also be combined and used to serve various enhanced protection features.

The EV circuit breaker 130 is configured to connect to an EV charging station 140 for the owner or occupant of the respective apartment unit protected by the tenant circuit breaker 120. The EV circuit breaker 130 is configured to interrupt power flow, as a safety measure in the event that the current draw exceeds a safety threshold. Electrical conduit may need to be run or installed from the EV circuit breaker 130 to a respective parking designation according to regional or local electrical codes. The EV circuit breaker 130 may be any type of circuit breaker for an EV charging station 140 capable of safely accommodating the power requirements needed to operate the EV charging station 140. As depicted in the figures below and similar to the tenant circuit breaker 120, the EV circuit breaker 130 may use a two-pole configuration. The amperage of the EV circuit breaker may range up to, for example, 80 A. EV charging stations 140 may use different powering requirements (e.g., between 12 A and 80 A). Due to the various EV charging station designs, different powering requirements and corresponding accessory equipment that may need to be used due to different powering requirements.

The EV charging station 140 may be any type of charging station 140 including, for example, a level 1 EVSE (electric vehicle supply equipment) or a level 2 EVSE, however, for the embodiments disclosed herein, the EV charging station 140 is preferably configured as a 240V split phase power distribution system. The type of charging station 140 may dictate the specifications of the EV circuit breaker 130 (e.g., the amount of current that is safe to use). Charging stations typically use between 12 A and 80 A, with most charging stations using less than 50 A.

The first load strap 118 and the second load strap 119 are configured to connect to both circuit breakers 120, 130 using stabs (also referred to as bus stabs, bus fingers, or connector fingers) to provide phase A and phase B powering. In the embodiments described herein, the electrical system preferably uses a split-phase configuration having two phases (phase A and phase B power) to power the EV charging station 140. Different configurations of the load straps 118, 119 are provided as described herein.

Figure 2:
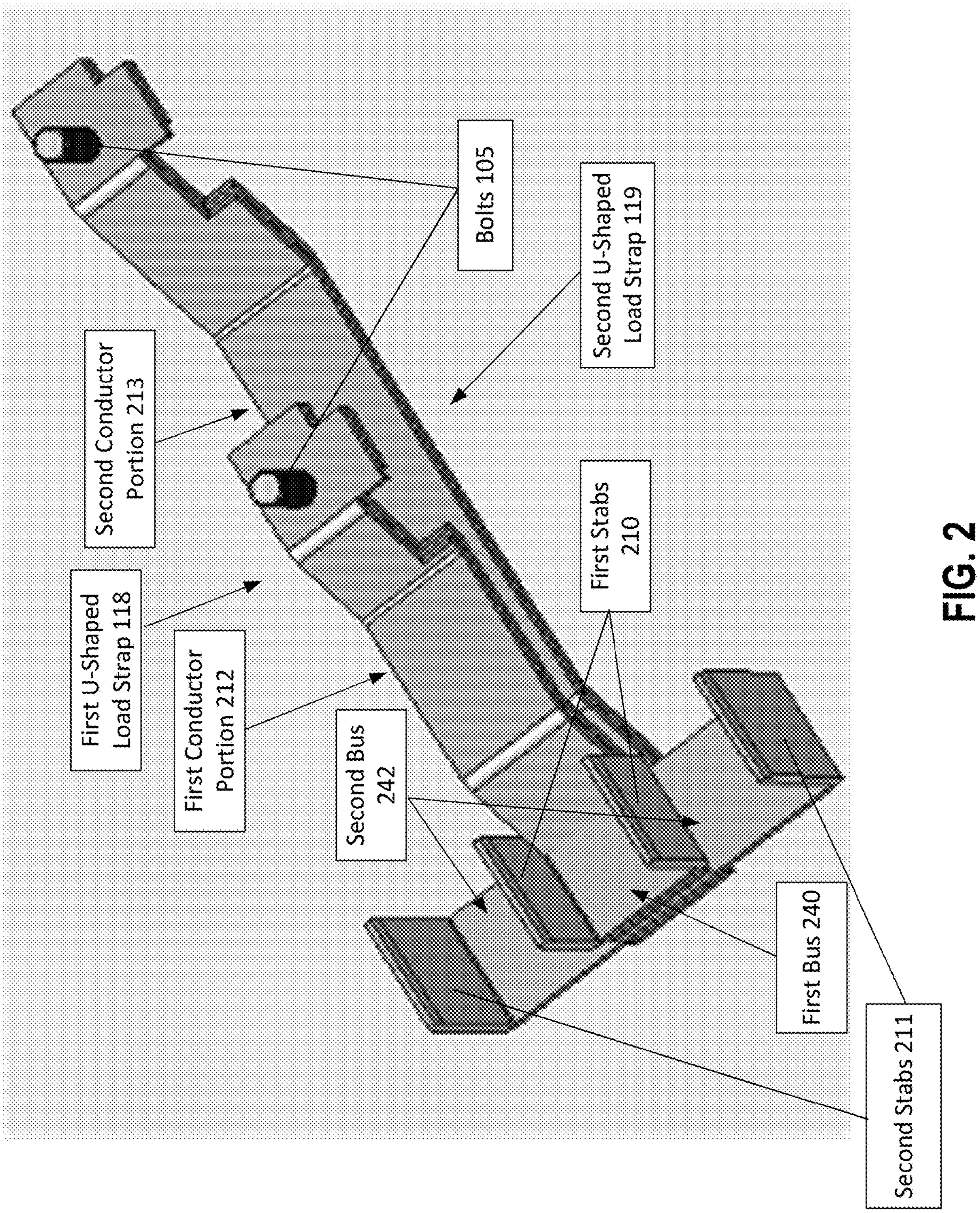
FIG. 2 depicts a first configuration including a pair U-shaped load straps, each having a conductor portion, and a U-shaped bus having a pair of U-shaped bus stabs to connect electrically parallel tenant and EV circuit breakers in multi-unit buildings for EV charging according to an embodiment.

In a first embodiment and as shown in FIG. 2, each U-shaped load strap 118, 119 comprises a first and second U-shaped conductor portion 212, 213, a first and second U-shaped bus 240, 242 and U-shaped stabs 210, 211, respectively. It should be noted that in the embodiments herein, any reference to a bus, includes the end of or an end section of the conductor portion, or an addition of conductive material between stabs or conductor material which connects to or between the stab(s). Moreover, the stab(s) does not necessarily require a bus, and may also be directly connected anywhere to the conductor portion. In some embodiments having 2 or more stabs on a single load strap, the bus comprises the two or more stabs and the conductive portion or conductive material between two stabs. In the embodiment which has one stab, the bus comprises the end portion of the conductor portion and the stab. Furthermore, the composition of the stabs, conductor portion, and conductive portion between stabs may all be of different conductive material or of the same conductive material.

One end of the load straps 118, 119 connects to the A phase or B phase connection point within meter socket 115. The first and second buses 240, 242 comprise a pair of first and second stabs 210, 211 respectively. The U-shaped stabs 210, 211 are used to engage the female connector 123 of both the tenant circuit breaker 120 and the EV circuit breaker 130. The conductor portions 212, 213 of the load straps 118, 119 may be made from a single conductor layer or may be made from the layering of two or more conductor layers. In FIG. 2, the conductor portions 212, 213 of the load straps 118, 119 are made of two layers of conductors with one pair of U-shaped stabs 212, 211. The U-shaped bus 240 is connected to the first layer of the first conductor portion 212, while the second layer of the first conductor portion extends underneath the first layer since there is no need for the second layer to have a U-shaped bus with stabs. A similar configuration or construction is applicable to the second U-shaped load strap 119. The first layer of the second U-shaped load strap 119 is connected to the U-shaped bus 242 having stabs 211, while the second layer of the conductor portion 213 extends underneath the first layer of the second U-shaped load strap 119. The two stabs 211 are conductively connected to each other via the conductive portion between the two stabs 211. The layered configuration referenced above is also applicable to the other embodiments referenced below. However, although layering is a preferable construction, a single layer of a thicker conductor (as needed) or a one piece design is also available to any of the embodiments herein.

The first U-shaped load strap 118 is preferably shorter in length than the second U-shaped load strap 119 and preferably fits on top of the second load strap 119 in a spooning or congruent manner. Although it is preferable for the first load strap to be shorter in length, it is not necessary and can be of the same length depending on the method of connecting the U-shaped load straps 118, 119 to the meter socket 115. The relative lengths and bends of the conductor portions 212, 213 may vary according to the needs and space limitations within the enclosure of a load center or electrical panel and the orientation, configuration, and ampacity of load straps 118, 119 of the circuit breakers 120, 130 and other electrical components such as bus bars and other electric accessories. Depending on the spacing between the U-shaped load straps 118, and 119, an insulative sheath of non-conducting material such as non-conductive heat shrink tubing or wrap made from plastics, silicon, rubber or other insulative materials may be used to prevent contact, arcing or ground fault events between the two load straps. Although an insulative sheath is preferable, bare load straps and insulated load straps may be used alone or combination provided they meet the local and regional electrical codes.

In FIG. 2, the U-shaped bus stabs 210, 211 are connected to or are a part of the first and second buses 240, 242 and then the buses 240, 242 are connected to the rest of conductor portions 212, 213. The stabs 210, 211 are oriented in a direction to engage with the female connector 123 (slot). In FIG. 2, the stabs 210, 211 are substantially perpendicular to the conductor portions 212, 213 of load straps 118, 119, although such a perpendicular configuration is not necessary if the female connector 123 is oriented in a different mating position. The distance between the two stabs 210 of load strap 118 is preferably and substantially about the width of the conductor portions 212, 213. In contrast, the second load strap 119 has stabs 211 that are further apart and above and below stabs 210, 211 and are configured at a distance sufficient to allow the two double pole circuit breakers 120, 130 capable of mating with the stabs 210 and stabs 211. The composition of the load straps disclosed herein may be of any conductive material such as copper, aluminum, steel-cored aluminum, galvanized steel, cadmium copper, silver or any conductive composite or any other conductive material. In one embodiment the stabs 210, 211 may be made of a different conductive material such as gold, copper, silver, or any other more conductive material alone or in combination based on the performance needs, distribution of power and the costs associated with the use of expensive conductive material.

At the opposite end of the conductor portions 212, 213, connecting bolts 105 may be used to connect the two layers (or any other number of layers) of conductor portions 212, 213 and to connect to either phase A or phase B of the meter socket 115. When installed within an enclosure, the U-shaped load straps 118, 119 may be diverging, parallel and/or in contact as they extend out and away from the meter socket 115.

Figure 3:
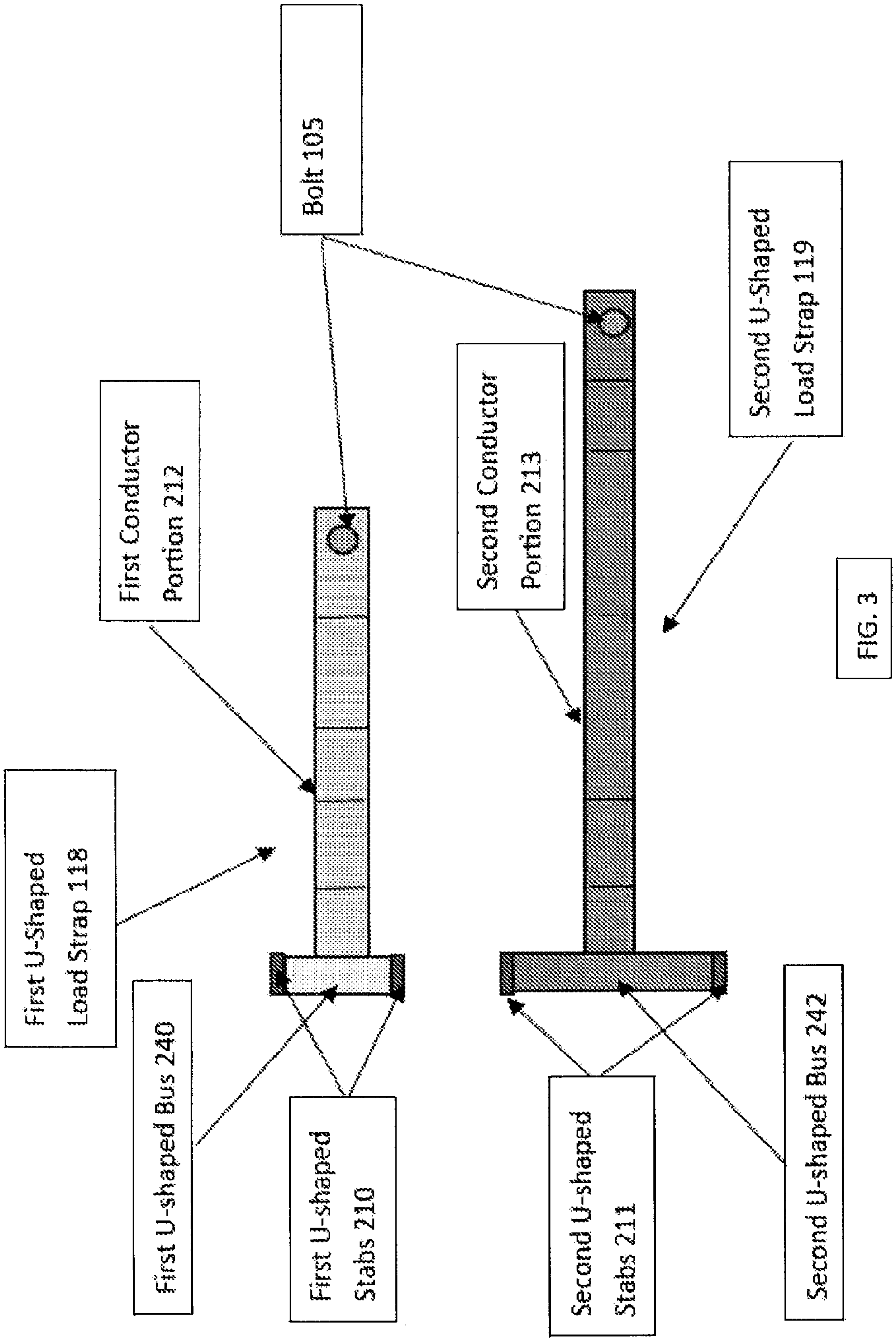
FIG. 3 depicts a deconstructed or separated view of the U-shaped load straps of FIG. 2 according to an embodiment.

FIG. 3 is a top view of a separated or deconstructed view of the U-shaped load straps 118, 119, demonstrating the relative position of the conductor portions 212, 213 and the U-shaped stabs 210, 211. The first load strap 118 may be placed in contact or nestled on top of the second load strap 119 or alternatively may by placed adjacent to each other without any contact whereby there is a spacing lengthwise between the two load straps 118, 119. The two U-shaped load straps 118 and 119 (other than the stabs 210, 211) may be electrically insulated from each other by having the one or more conductor portions 212, 213 covered by an insulator such as a plastic or other insulator material such as plastics, silicon, rubber or a composite of insulative materials to prevent electrical contact between the two U-shaped load straps 118, 119 as well as preventing any possible arcing or other fault events between the two load straps 118, 119.

Figure 4:
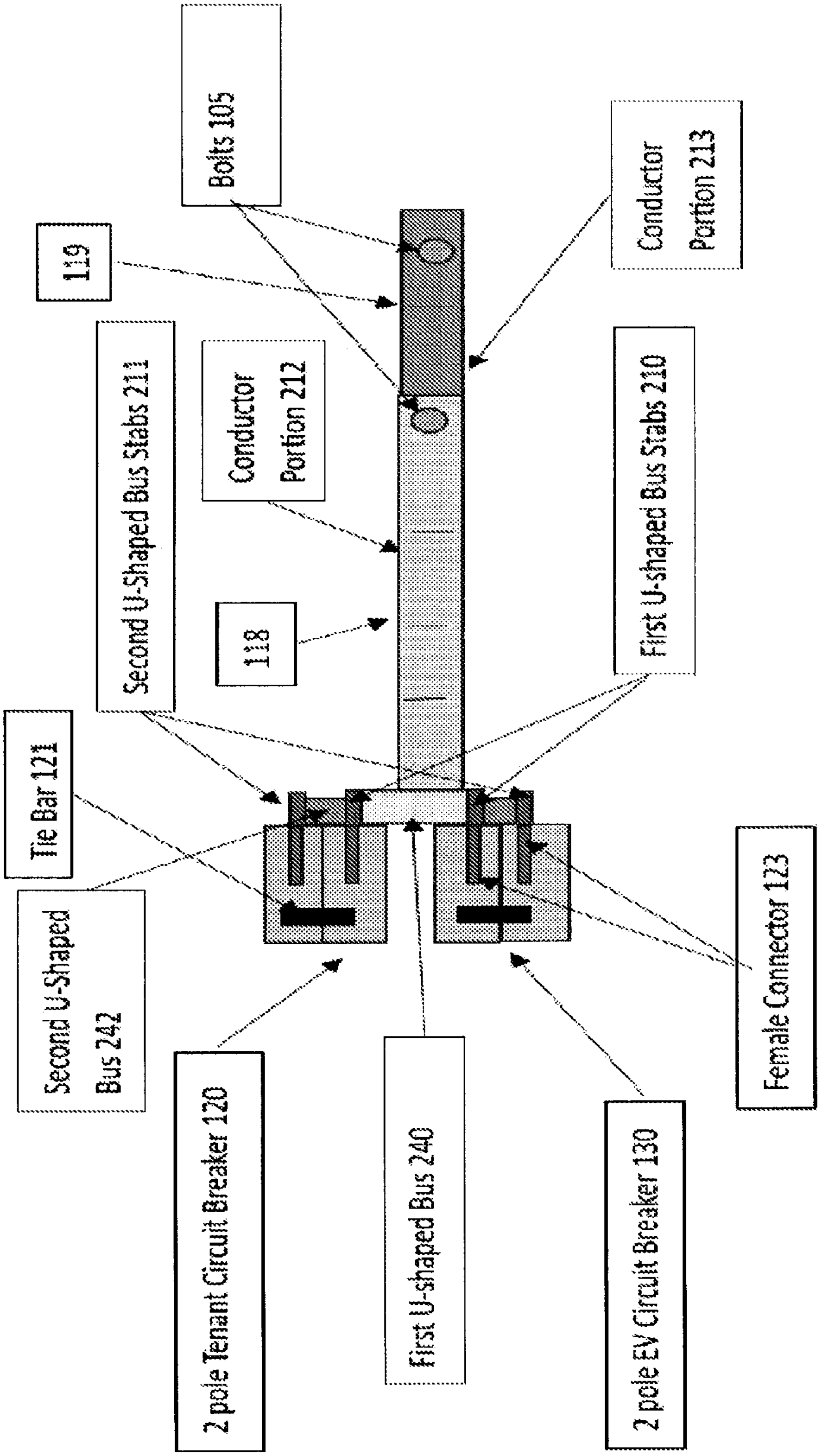
FIG. 4 depicts a pre-installation placement of vertically stacked side by side orientation of the the to be installed tenant and EV circuit breakers using U-shaped load straps of FIG. 3 according to an embodiment.

FIG. 4 depicts a top view of the first load strap 118 and the second load strap 119 (both previously shown in FIG. 3) arranged on top of one another-either or both load straps 118, 119 may be insulated. Alternatively, the load straps 118, 119 may be placed proximately and without contact such that a safe space may exist between the two surfaces of load straps 118, 119. Moreover, load straps 118, 119 may or may not follow substantially the same common longitudinal axis of either load strap 118, 119 and may have divergent longitudinal axes. Depending on the connecting point with the meter socket 115, the load straps 118,119 may be orientated in various relative positions to accommodate the spacing requirements within an enclosure of any electrical panel.

The tenant circuit breaker 120 and the EV circuit breaker 130 in FIG. 4, are each two pole circuit breakers shown in a pre-installed position and substantially vertically positioned. In this embodiment, the two handles of each of the two pole circuit breakers are mechanically tied together with a tie bar 121 as are commonly found in the circuit breaker industry. Double pole circuit breakers protect the two hot or active wires and electrically connected devices and generally share a common neutral wire. These two hot wires typically supply electricity for large 240 volt appliances such as clothes dryers and water heaters and more specifically, EV charging stations 140. In this configuration, the use of one hot wire and a neutral wire may be used to provide a 120V connection. A typical double pole circuit breaker has an ampacity range of 15 to 200 amps. To achieve the voltage and ampacity range, each pole of the two pole circuit breakers 120, 130 is configured to handle one or a single phase (phase A or phase B) of a split-phase configuration.

The two pole circuit breakers 120, 130 are installed by connecting female connectors 123 (slots) to the respective male connectors shown as U-shaped bus stabs 210, 211. The orientation and placement of the U-shaped bus stabs 210, 211 dictate the orientation and placement of the circuit breakers 120, 130. Different orientations of the two pole circuit breakers 120, 130 may allow for different configurations of panel components and wiring. Moreover, different electrical panels may require different orientations of the circuit breakers 120, 130 and in some cases, may only permit a horizontal or a staggered orientation. In some electrical panel enclosures, space optimization may require a combination of both horizontal and vertical placement of circuit breakers 120, 130. These different orientation of circuit breakers and other related components within an electrical enclosure are dictated by the placement of certain knockouts or openings to pull cable or include additional or different, electrical components such as rails, bus bars or other conductors.

Figure 5:
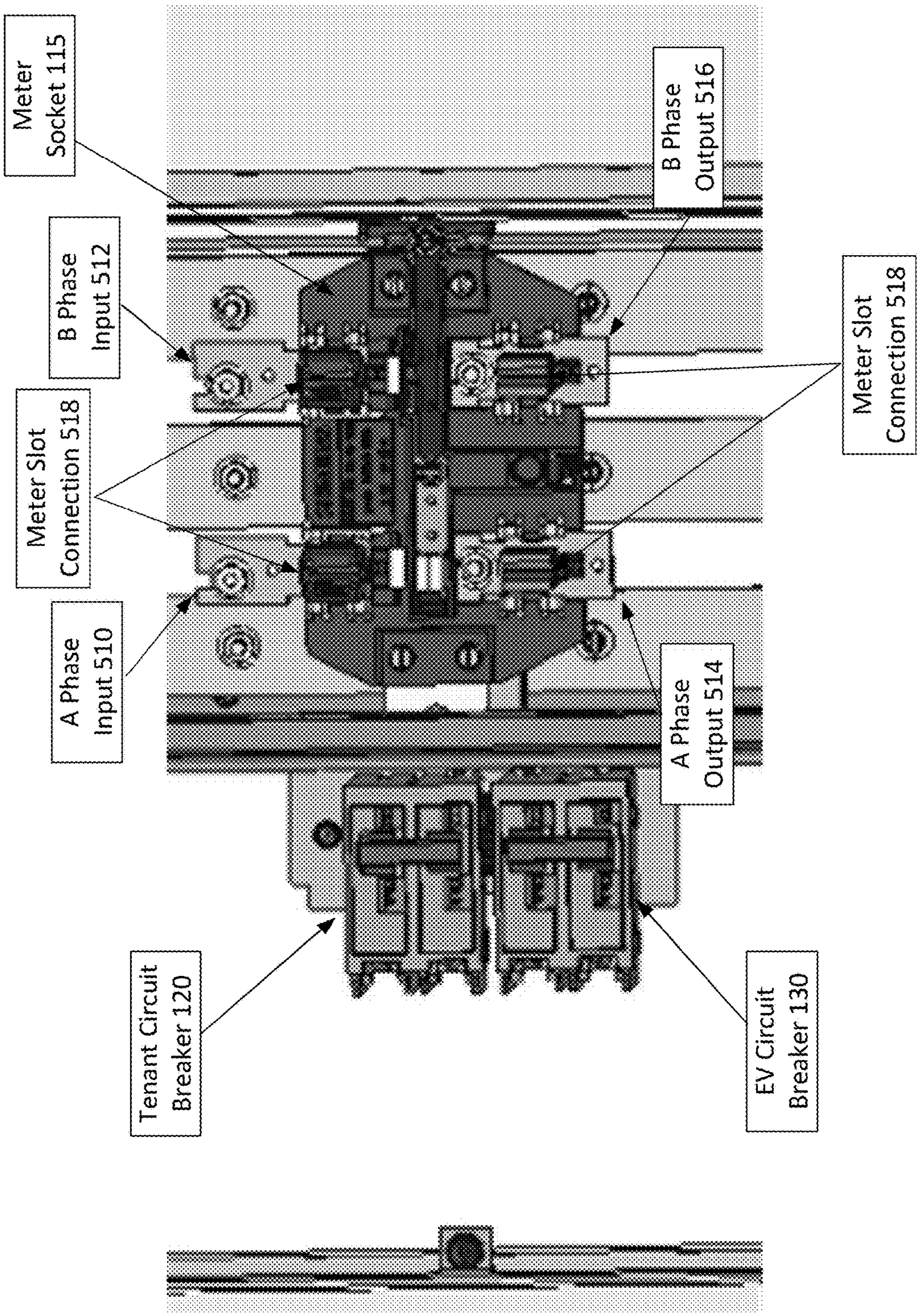
FIG. 5 depicts an installed view of a substantially vertically stacked side by side orientation of the tenant and EV circuit breakers in an example implementation according to an embodiment.

FIG. 5 depicts an example of a substantially vertically stacked arrangement of FIG. 4 as implemented into an electrical panel with a meter socket 115 and two double pole circuit breakers 120, 130. The meter socket 115 is connected to both the A phase and B phase power lines as well as a neutral conductor and ground. A phase and B phase inputs 510,512 are connected at the top of meter socket 115. The meter socket 115 in turn connects to the load straps 118, 119 as well as connecting to a metering device 110. The four slot connections 518 on meter socket 115 provide a female receptable for the stabs of a modular (replaceable) meter device 110 (not shown). The load straps 118, 119 connect to the A phase and B phase provided by the meter socket 115 via bolts 105 or other connecting means. From the back side of meter socket 115, the load straps 118, 119 extend towards the tenant circuit breaker 120 and EV circuit breaker 130 and connect via U-shaped bus stabs 210, 211 to the underside of the tenant and EV circuit breakers 120, 130 and mate with the respective female connectors 123.

Figure 6:
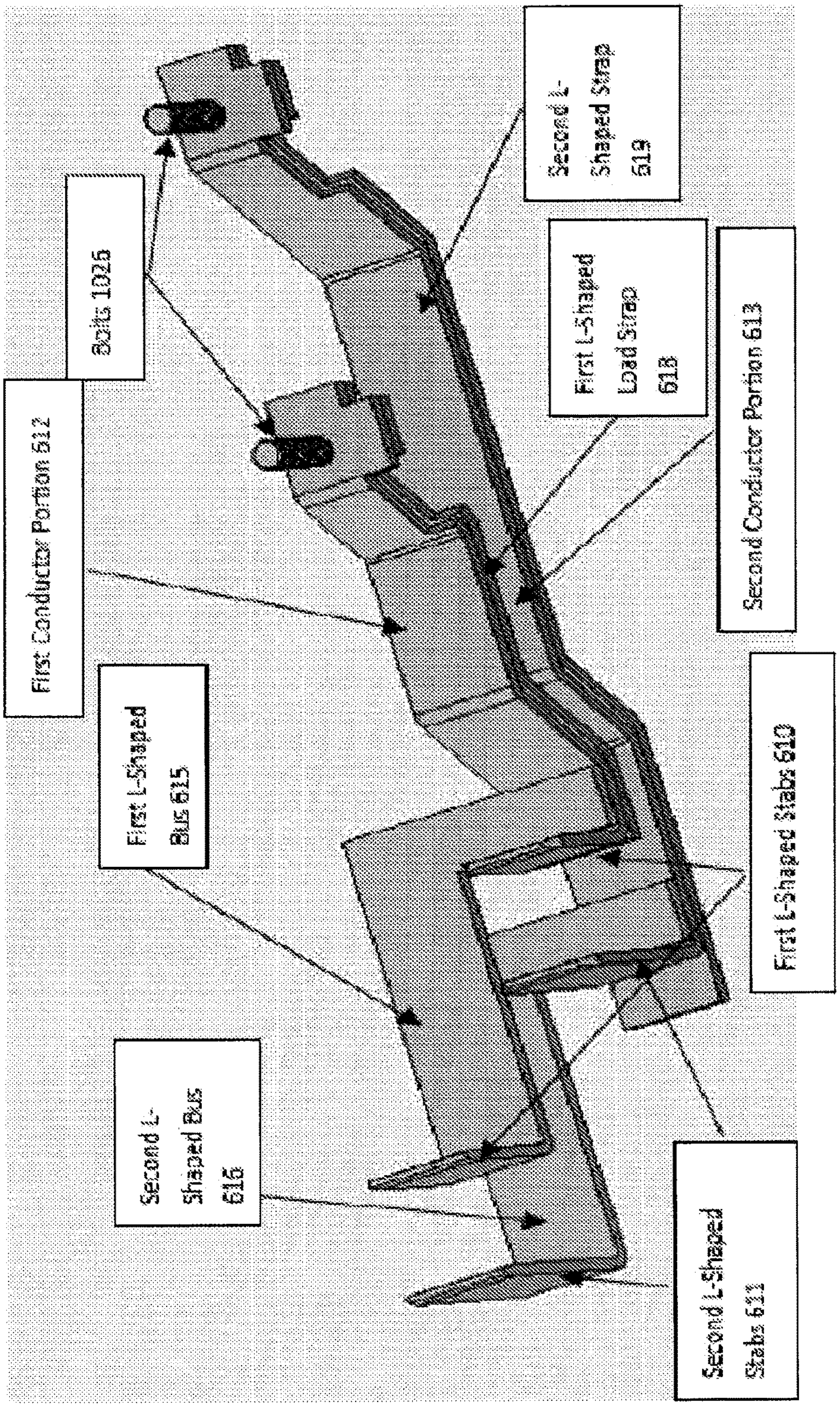
FIG. 6 depicts an example of a second configuration including a pair of L-shaped load straps, each having a conductor portion, and L-shaped Buses each having a pair of L-shaped bus stabs to connect electrically parallel tenant and EV circuit breakers in multi-unit buildings for EV charging according to an embodiment.

FIG. 6 depicts an alternative load strap design that allows for a substantially horizontal orientation of the Tenant circuit breakers 120 and EV circuit breaker 130. Like the load straps 118, 119 of FIG. 2, the L-shaped load straps, 618, 619 have stabs 610,611, L-shaped buses 615, 616, conductor portions 612, 613. One end of the L-shaped straps 618, 619 connect to phase A or phase B of the two hot wires connected to the meter socket 115. From the connection point of the meter socket 115, the load straps 618, 619 extend towards the tenant and EV circuit breakers 120, 130 through a first and second conductor portion 612, 613 and onto the L-shaped buses 615, 616 towards the corresponding pair of L-shaped stabs 610, 611. The L-shaped stabs 610, 611 like the U-shaped stabs 210, 211, mate with a corresponding female connector 123 of tenant and EV circuit breaker 120, 130. As may be evident from FIG. 6, the L-shaped stabs 610, 611 are oriented to connect the tenant and EV circuit breakers 120, 130 in a substantially horizontal manner. Unlike the stabs 210, 211, the stabs 610, 611 are generally and substantially oriented in a vertical manner in order to mate with the female connectors 123 of circuit breakers 120, 130 in generally substantially horizontal manner.

Like the load straps 118, 119, the load straps 618, 619 have the same possible layering of the conductor portions 612, 613. and L-shaped buses 615, 616. It should be understood that the same available construction, insulation and composition considerations previously cited above in FIG. 2 and the other embodiments herein, are equally applicable. In FIG. 6, each L-shaped load strap 618, 619 have two layers of conductor portions 612, 613. The first L-shaped load strap 618 has a conductor portion 612 (first layer) having an end section which connects to or forms into a first L-shaped bus 615, and connects to the first L-shaped stabs 610. The first layer of conductor portion 612 extends to the conductive portion electrically connecting the first and second stabs 610 of the first L-shaped load strap 618. In a second layer of the first L-shaped load strap 618, the conductor portion 612 extends underneath the first layer of the L-shaped conductor portion towards the first L-shaped stab of the two L-shaped stabs 610.

In FIG. 6, the conductor portions 612, 613 of the load straps 618, 619 are preferably made of two layers, although one or more than two layers may be used based on the intended purpose. As shown in FIG. 6, the first load strap 618 is preferably shorter in length than the second load strap 619 and preferably fits on top of the second conductor strap 619 in a spooning or congruent manner, or may be spaced apart as necessary. Although the first load strap 618 is preferably shorter than the second load strap 619, the second load strap 619 may be of the same length, shorter or longer depending on the method of attaching the first and second load straps 618, 619 to the modular meter socket 115. The relative lengths and bends of the conductor portions 612, 613 may vary according to needs and limitation within the enclosure of an electrical panel of the proposed orientation, configuration, and ampacity of load straps 618, 619 of the circuit breakers 120, 130 and other electrical components such as bus bars and other electrical accessories. Depending on the spacing between the load strap 618, and 619, an insulative sheath of non-conducting material such as non-conductive heat shrink tubing material or wrap made of for example silicon, rubber, plastics or other insulative material that may be used to prevent contact or arcing events between the two load straps. Although insulative sheaths are preferable on either or both of these load straps 618, 619, bare load straps and insulated load straps may be used alone or in combination provided they meet local and regional electrical codes.

The stabs 610, 611 are part of the L-shaped buses 615, 616 and are connected at one end to the first and second conductor portions 612, 613 which are thereafter connected to the meter socket 115. The stabs 610, 611 are oriented in a direction to engage with the female connector 123 (slot). In FIG. 6, the stabs 610, 611 are substantially perpendicular to the ends of the first and second L-shaped buses 615, 616 and/or the first and second conductor portions 612, 613, although such a perpendicular configuration is not necessary if the female connector 123 is oriented in a different mating position. The two stabs 610 of L-shaped bus 615 are positioned at each end of the L-shaped bus 615 in a substantially perpendicular configuration. The first L-shaped bus, 615 comprises the conductive portions between the two stabs 610 and the two stabs 610. Correspondingly, the second L-shaped bus, 616 comprises the conductive portion between the two stabs 611 and the two stabs 611. The stabs 610, 611 of L-shaped buses 615, 616 are positioned at each end of the L-shaped bus 615, 616 in a substantially perpendicular configuration. Moreover, the distance between the two lower two stabs 610, 611 and the two upper stabs 610, 611 should be configured to match the mating distance between the female connectors 123 of the two pole circuit breakers 120, 130. The composition of the load straps 618, 619 may be of any conductive material such as copper, aluminum, steel-cored aluminum, galvanized steel, cadmium copper, silver or any conductive composite or any other conductive material. In one embodiment the stabs 610, 611 may be made of a different conductive material such as gold, copper, silver, or any other conductive material alone or in combination based on the performance needs for the distribution of power and the costs associated with the use of expensive conductors.

When both load straps 618 and 619 are used in an electrically parallel manner within an enclosure, the load straps 618, 619 are preferably insulated with insulative materials normally used in the industry such as plastics, plastics, silicon, rubber and other insulative materials. Although FIG. 6 depicts the load straps 618, 619 as being nested or nestled and making contact, the two load straps 618, 619 can be configured in a non-contact manner. The arrangement of the stabs 610, 611 will provide a substantially horizontal positioning of the tenant circuit breaker 120 and the EV circuit breaker 130. Depending on the width of the stabs and the corresponding female connector 123, the placement of circuit breakers 120, 130 may be horizontal in substantially a side by side manner. Each stab 610, 611 will provide a phase A and phase B powering, respectively.

Figure 7:
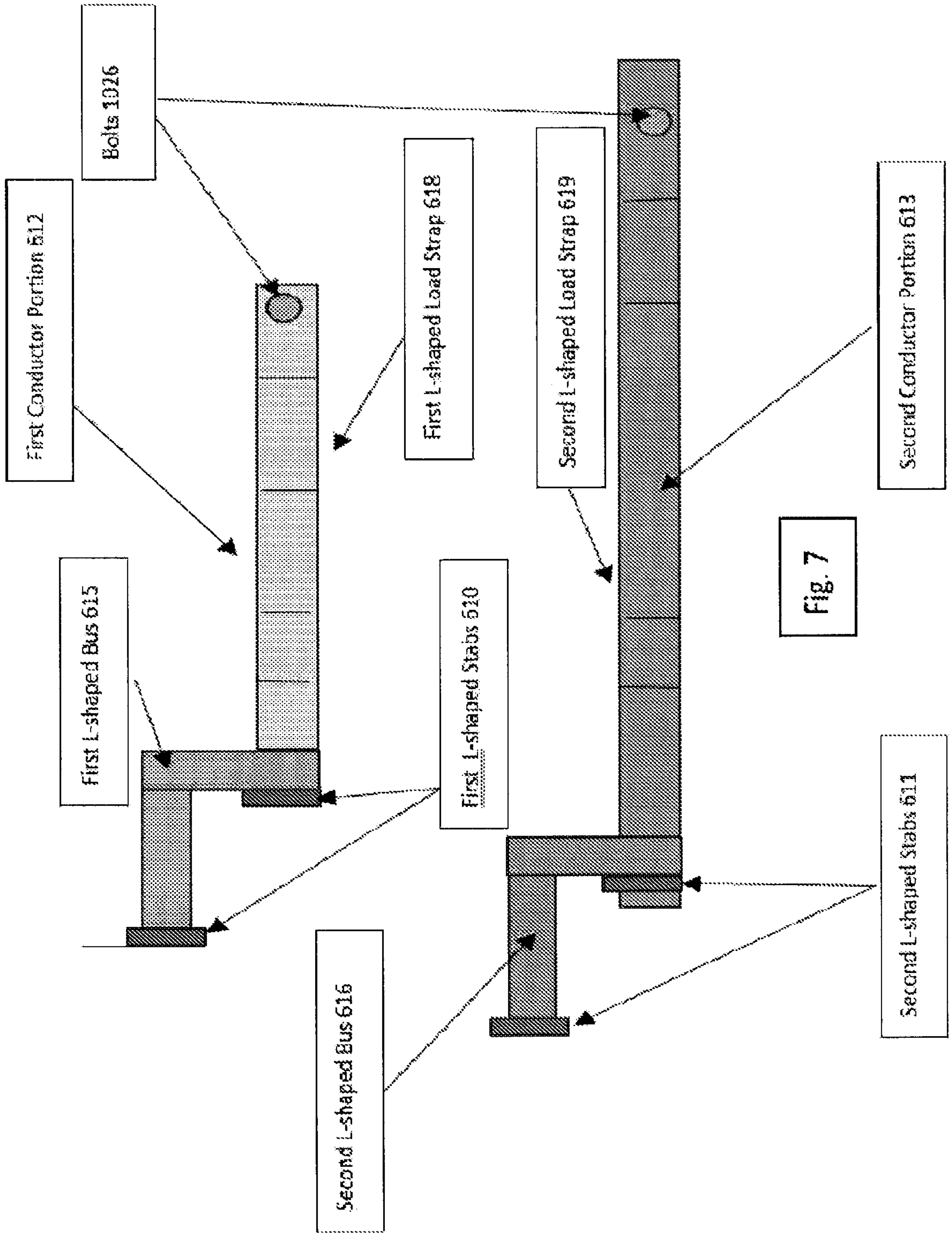
FIG. 7 depicts a deconstructed or separated view of a pair of L-shaped load straps, of FIG. 6 according to an embodiment.

FIG. 7 depicts the first load strap 618 and the second load strap 619 of FIG. 6 in a separated view demonstrating the relative position of the L-shaped stabs 610, 611, the L-shaped buses 615, 616 and conductor portions 612, 613. The first load strap 618 and the second load strap 619 each include a pair of stabs 610, 611 respectively. The first load strap 618 is connected to a first L-shaped bus 615 that includes stabs 610. The second load strap 619 is connected to a second L-shaped bus 616 that includes stabs 611. In the configuration shown in FIG. 6 and FIG. 7, the stabs are substantially vertically configured to allow an alternating phase A and phase B scheme while allowing the two double pole circuit breakers 120, 130 to be positioned in a substantially horizontal manner.

Figure 8:
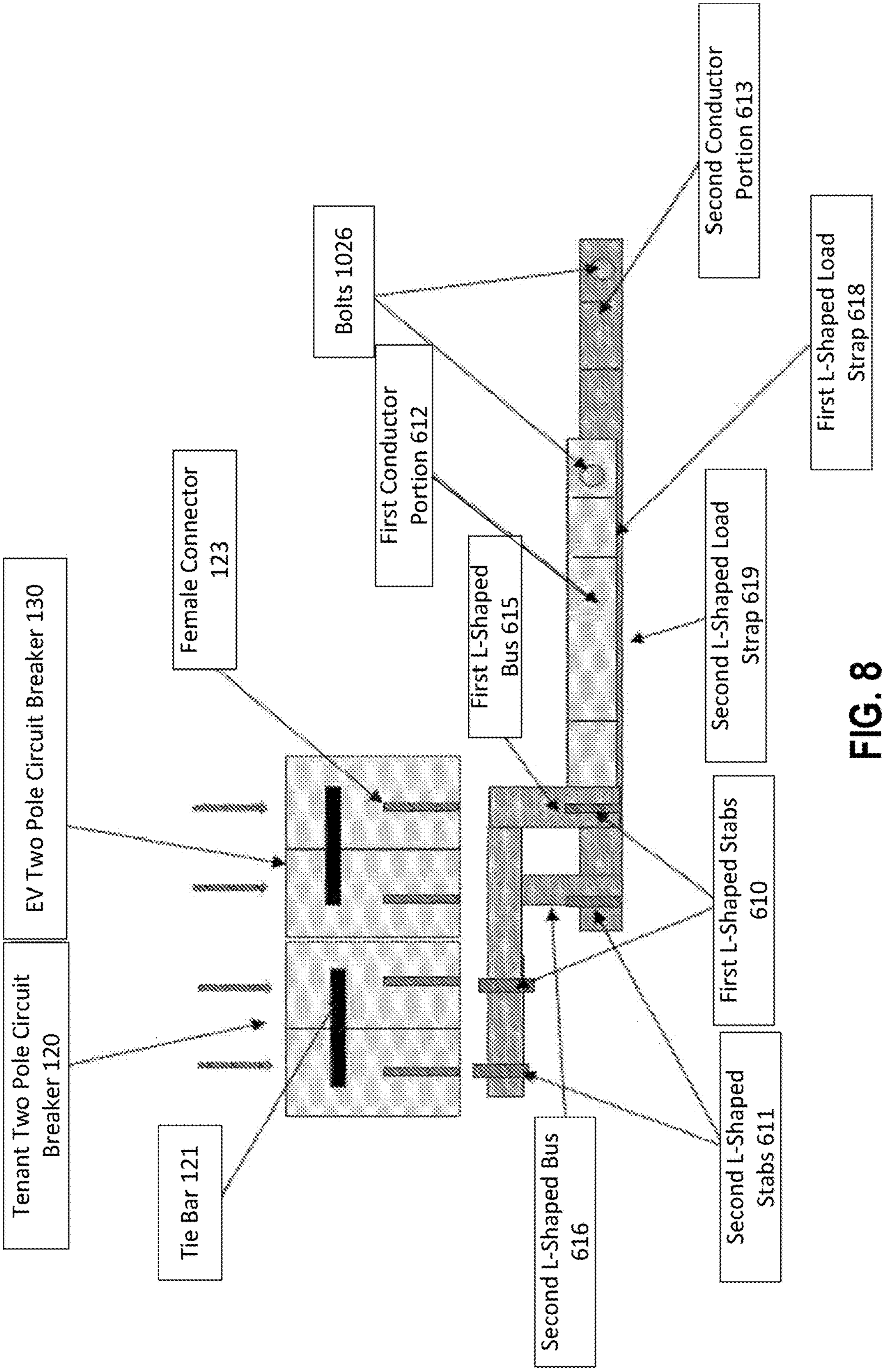
FIG. 8 depicts a pre-installation placement of a substantially horizontal side by side orientation of the uninstalled tenant and EV circuit breakers using L-shaped load straps of FIG. 7 according to an embodiment.

FIG. 8 depicts how the circuit breakers 120, 130 are oriented (prior to installation) using the first L-shaped load strap 618 and the second L-shaped load strap 619. The circuit breakers 120, 130 are oriented side by side in a substantially horizontal manner. The EV circuit breaker 130 and the tenant circuit breaker 120 are connected in an electrically parallel manner in order to provide powering to the EV charging station 140 and the loads associated with an apartment unit (appliances for example).

Figure 9:
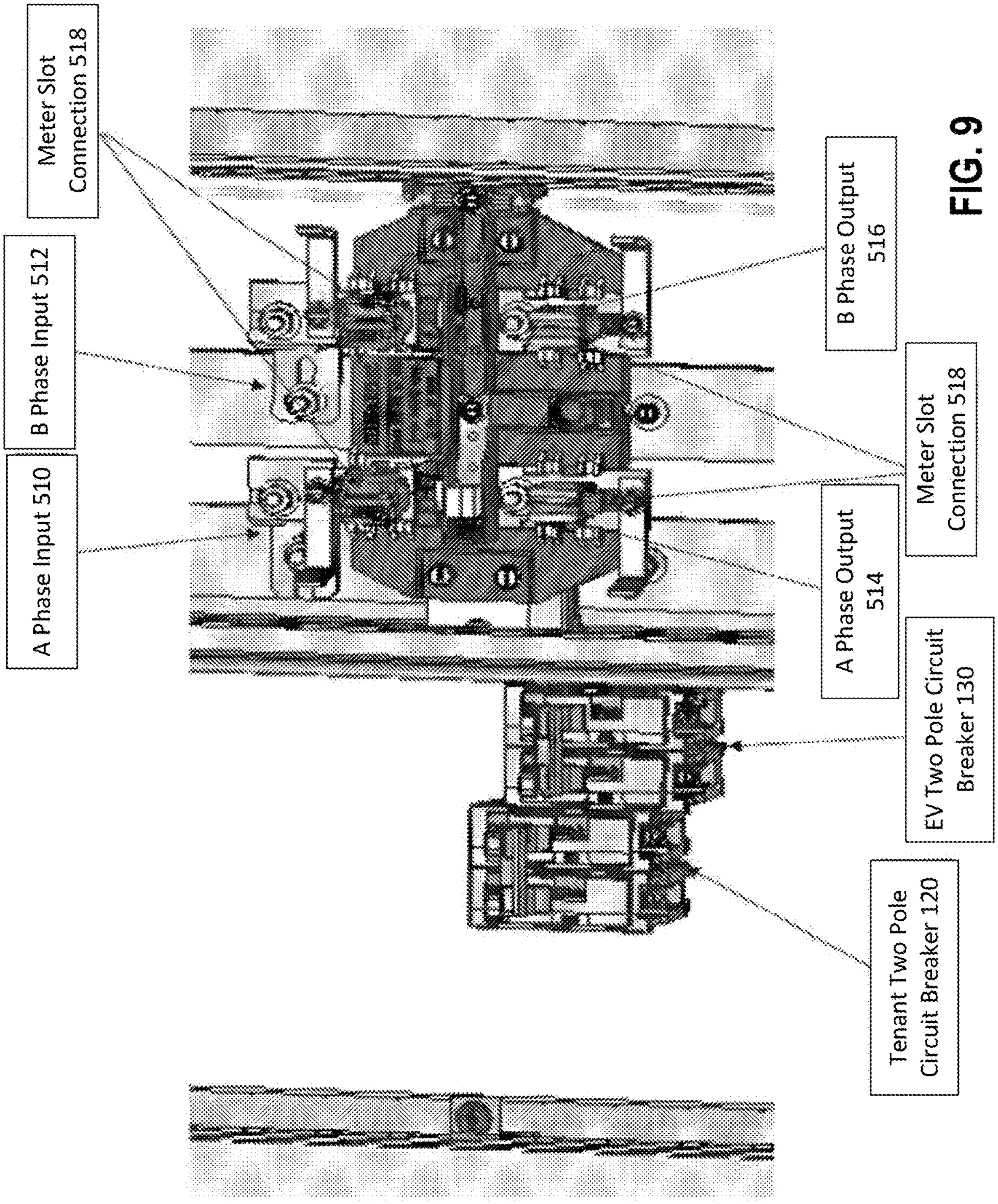
FIG. 9 depicts a substantially horizontal side by side orientation of the tenant and EV circuit breakers in an example implementation according to an embodiment.

FIG. 9 depicts an example of the configurations of the circuit breakers 120, 130 of FIG. 8 as implemented into an enclosure with an adjacent meter socket 115. FIG. 9 also depicts the two circuit breakers 120, 130 in a substantially horizontal orientation with respect to one another. In yet another embodiment, either or both circuit breakers 120, 130 may be rotated 180 degrees and installed upside down. The selection of the orientation of the circuit breakers 120, 130 will depend on the type and model of the electrical panel, accessibility, and other components that may prevent certain orientations.

Figure 10:
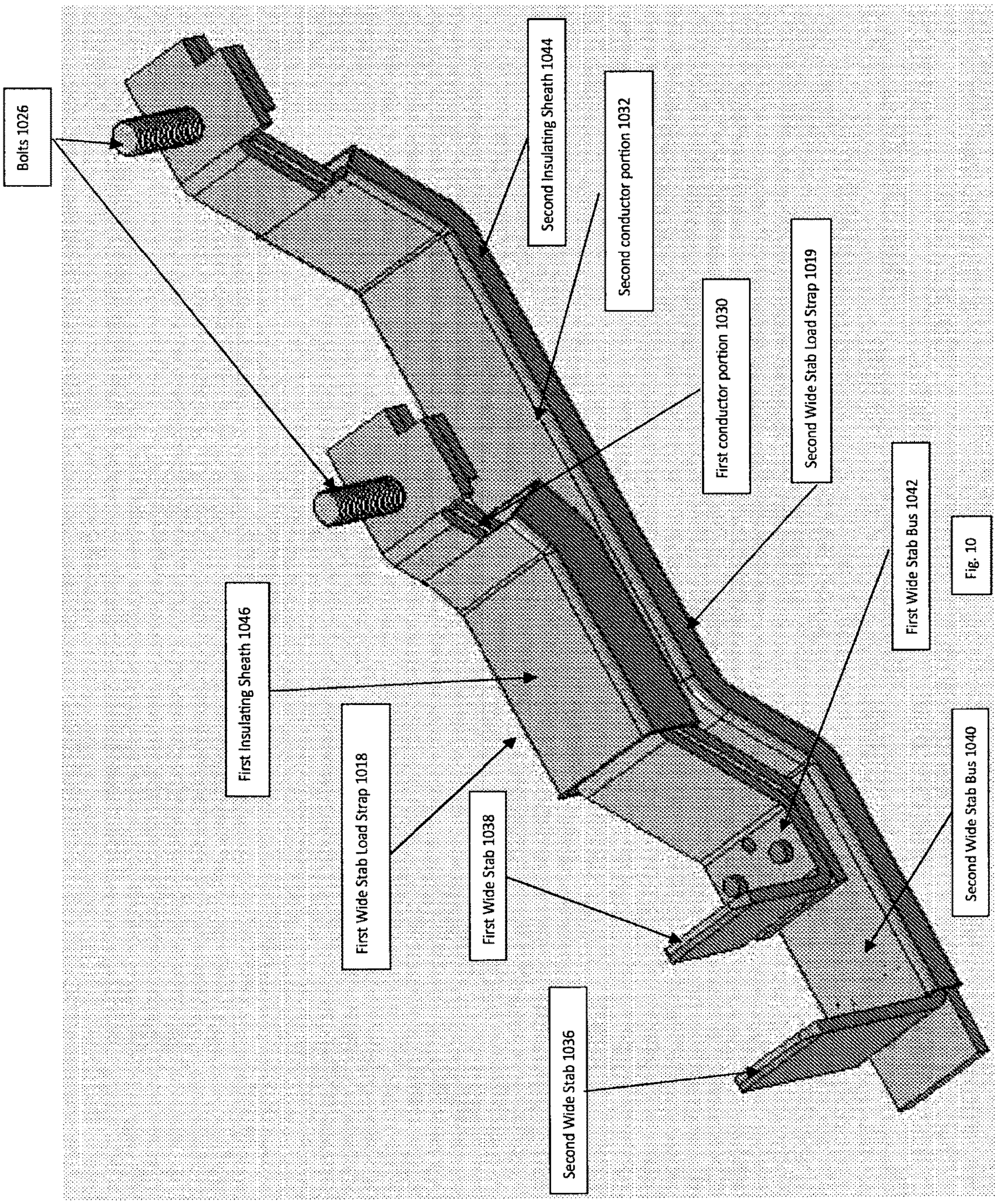
FIG. 10 depicts an example of a third configuration including two wide stab load straps, each having a conductor portion and wide stab bus having a wide stab to connect electrically parallel tenant and EV circuit breakers in multi-unit buildings for EV charging according to another embodiment.

FIG. 10 depicts an alternative load strap design that allows for a substantially vertical orientation of the Tenant circuit breakers 120 and EV circuit breaker 130. In addition, FIG. 10 depicts an example of a split-phase powering configuration whereby each wide stab load straps 1018, 1019 has only one wide stab 1038, 1036 respectively and yet accommodates two (2) double pole circuit breakers 120, 130. The first load strap 1018 comprises a first wide stab 1038, a first wide-stab bus 1042, a first wide-stab conductor portion 1030. The second load strap 1019 comprises a second wide-stab 1036, a second wide stab bus 1040, a second wide stab conductor portion 1032. Reference to the term "wide" in this embodiment is meant to refer to the associated parts of the wide stab load straps 1018, 1019 and not necessary as dimensionally limiting in the sense that the associated parts are necessarily wider than industry standard usage. The term "wide" herein is used to reference the requirement that the wide stabs 1038, 1039 are dimensionally sufficient to mount and share wide stabs 1038 or 1039 with two double pole circuit breakers 120, 130.

At one end of the wide stab load straps 1018, 1019, a bolt 1026 or any other connecting means may be used to connect to one of the A or B phases at a connection point (load side) provided by meter socket 115. From the bolt 1026, the first conductor portion 1030 extends to the other end and connects to the first wide stab bus 1042, which is connected to first wide stab 1038 (the first wide stab bus 1042 comprises first wide stab 1038). The first wide stab 1038 is made wider or wide enough (depending on the manufacture of the power panel and associated breakers) so as to accommodate two circuit breakers on the same A or B phase, although if some stabs are already wide enough, a wider than usual stabs may not be needed. Both the tenant circuit breaker 120 and the EV circuit breaker 130 will each share the same phase A or B wide stab 1036, 1038. Similarly, the second wide load strap 1019 from the bolt 1026 extends to the other end through the second wide conductor portion 1032, the second wide stab bus 1040 which is connected to the second wide stab 1036 (the second wide stab bus comprises second wide stab 1038). The stab 1036 is made dimensionally wide enough (depending on the manufacturer of the power panel and associated breakers) so as to accommodate two circuit breakers on the same A or B phase, although if some stabs are already wide enough, a wider than usual stabs may not be needed. Both the tenant circuit breaker 120 and the EV circuit breaker will share the same phase A or B, connecting stab.

A comparison of the length of both load straps 1018, 1019, reveals that the first load strap 1018 is shorter than the second load strap 1019. Moreover, it should be noted that both load straps 1018, 1019 preferably have an insulating sheath 1044, 1046 as previously mentioned for the prior embodiments. The first and second load strap 1018, 1019 have an insulating sheath 1044, 1046 that extends along the conductor portion 1030, 1032. Like the other embodiments, each the load straps 1018, 1019 may be made of the layering of two or more conductive layers held in place by bolt 1026 as well as other connecting means at the other end and associated sheaths 1044, 1046 in order to accommodate the necessary safety requirements of a conductive pathway at various amperages.

The first layer of wide stab load strap 1018 extends from the bolt 1026 or connecting means to the first wide stab bus 1042 via first conductor portion 1030 and then to a conductive portion which connects to the first wide stab 1038. The wide stab 1038 is part of the wide stab bus 1042. The wide stab 1038 may be connected to the end portion of the first conductor portion 1030 or can alternatively be part of the first conductor portion 1030 in which the end portion is bent in a substantially perpendicular manner. The second layer of the first wide stab load strap 1018 extends from the meter socket 115 connection point towards wide stab 1038 but is not connected or bent to form another stab. The second wide stab load strap 1019 is likewise configured as having one or more layers as the first wide stab load strap 1018. The insulating sheath 1044, 1046 may be used on either or both of the load straps 1018, 1019 and may be in contact or non-contact depending on the design needs within the electric panel.

The relative lengths and bends of the conductor portions 1030, 1032 may vary according to needs and limitation within the enclosure of an electrical panel of the proposed orientation, configuration, and ampacity of load straps 1018, 1019 of the circuit breakers 120, 130 and other electrical components such as bus bars and other electrical accessories. Depending on the spacing between the load strap 1018, and 1019, an insulative sheath of non-conducting material such as non-conductive heat shrink tubing materials or wraps made of silicon, rubber, plastics or other non-conductive materials. Although insulative sheaths are preferable on either or both of these load straps 1018, 1019, bare load straps and insulated load straps may be used alone or in combination provided they meet local and regional electrical codes.

Figure 11:
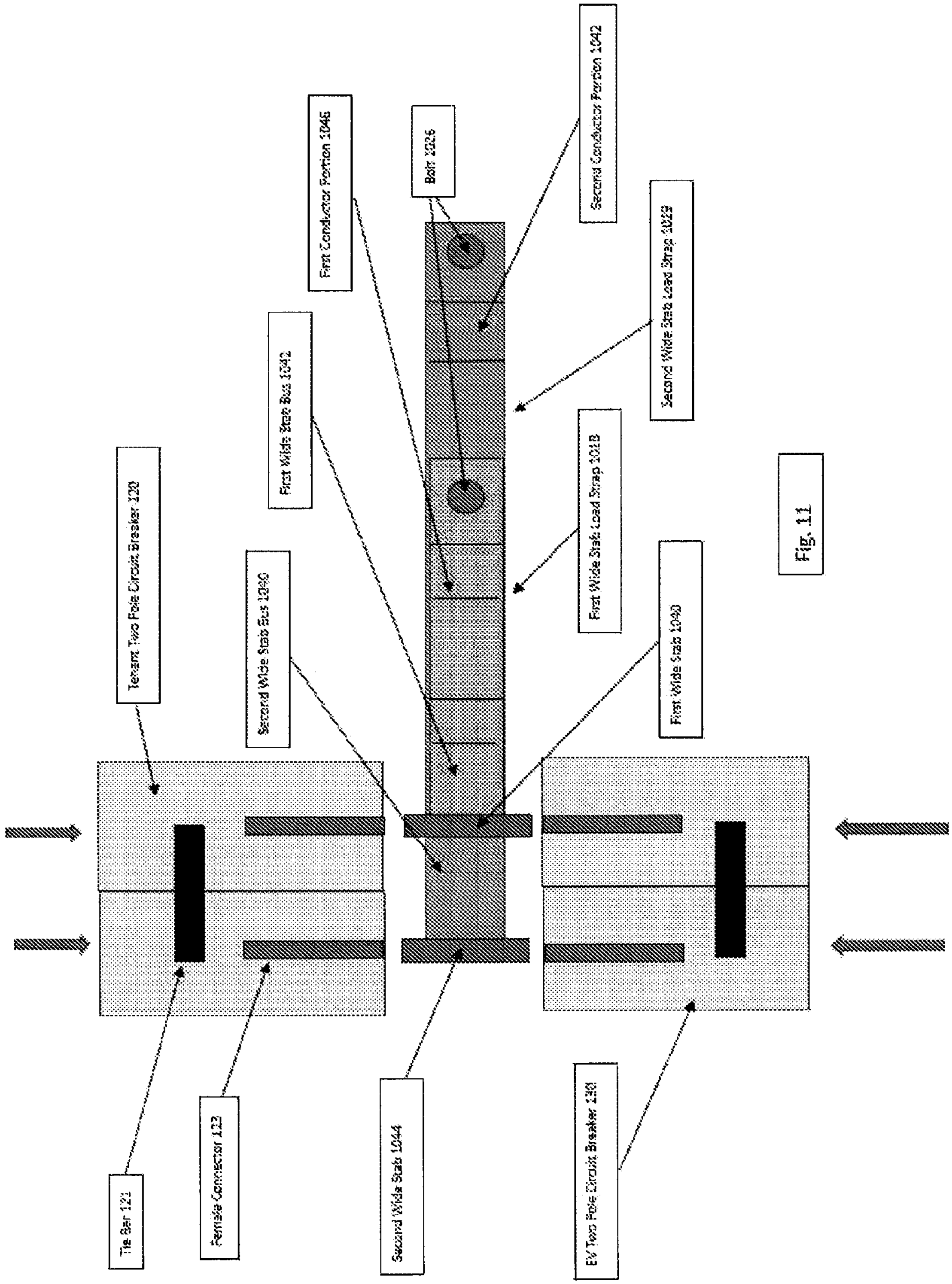
FIG. 11 depicts a pre-installation placement of substantially vertically stacked side by side orientation of uninstalled tenant and EV circuit breakers using the wide stabs according to the embodiment of FIG. 10.

FIG. 11 demonstrates the configuration and the pre-installation placement of the two pole circuit breakers 120, 130 onto the shared stabs 1040, 1042. Ideally, the stabs 1040, 1042 should have an ample space for engagement with female connectors 123 as shown in FIG. 11. In order to have the circuit breakers 120, 130 mounted onto the stabs 1040, 1042, the first load strap 1018 should be positioned a distance away from the stab 1042 of the second load strap 1019 which corresponds to the distance between the two female connectors 123 in both the tenant circuit breaker 120 and the EV circuit breaker 130.

Figure 12:
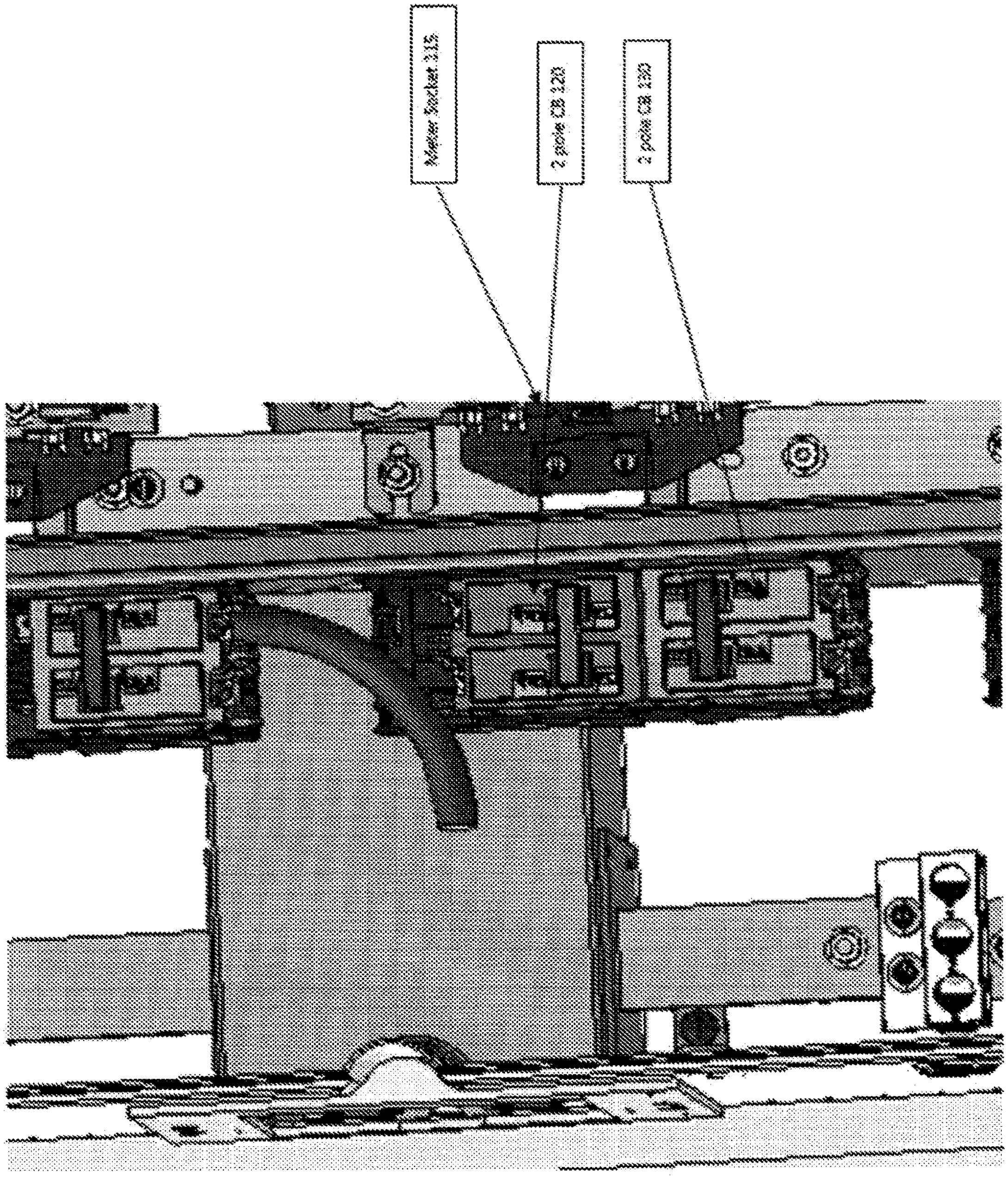
FIG. 12 depicts an example of installed tenant and EV circuit breakers using the wide stab load straps of FIG. 10.

FIG. 12 presents the implemented configuration and orientation of the circuit breakers 120, 130 within a panel enclosure of the circuit breakers 120, 130 and load straps 1018, 1019. The two circuit breakers 120, 130 are vertically connected by the load straps 1018 and 1019 to meter socket 115. As in the embodiments show herein, the configuration and orientation of load straps will depend upon various factors, such as panel size, safety concerns, bus routing within a panel enclosure, and the general accessibility of the components to be housed.

It is to be understood that the elements and features recited in the appended claims may be combined in different ways to produce new claims that likewise fall within the scope of the present invention. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A system for power distribution, the system comprising:

a metering device for measuring power consumption;

a meter socket connected to the metering device;

a first U-shaped load strap connected to the meter socket;

a second U-shaped load strap connected to the meter socket;

a tenant circuit breaker for an individual unit of a multi-family residence, the tenant circuit breaker connected to the first U-shaped load strap and the second U-shaped load strap; and an EV circuit breaker for an EV charging station located in a parking spot for the multi-family residence, the EV circuit breaker connected to the first U-shaped load strap and the second U-shaped load strap;

wherein the tenant circuit breaker and the EV circuit breaker are electrically connected in parallel to each of the first U-shaped load strap and the second U-shaped load strap, wherein the first U-shaped load strap comprises a first conductor portion connected to a first bus, and the second U-shaped load strap comprises a second conductor portion connected to a second bus, wherein the first bus is connected to a pair of first stabs, and the second bus is connected to a pair of second stabs, wherein the first bus and the pair of first stabs form a U-shaped portion of the first U-shaped load strap, and the second bus and the pair of second stabs form a U-shaped portion of the second U-shaped load strap, and wherein the first U-shaped load strap and the second U-shaped load strap are in contact and are positioned along a substantially common longitudinal axis.

2. The system for power distribution of claim 1, wherein one of the first stabs and one of the second stabs are each connected to both the tenant circuit breaker and the EV circuit breaker.

3. The system for power distribution of claim 2, wherein the tenant circuit breaker and the EV circuit breaker are arranged substantially vertically stacked side by side with respect to one another.

4. The system of claim 3, wherein the tenant circuit breaker and the EV circuit breaker are double pole circuit breakers.

5. The system of claim 4, wherein one U-shaped load strap of the first U-shaped load strap and the second U-shaped load strap includes an insulating sheath configured to electrically insulate the one U-shaped load strap from another of the first U-shaped load strap and the second U-shaped load strap.

* * * * *